(12) United States Patent
Yoon et al.

(10) Patent No.: US 9,738,152 B2
(45) Date of Patent: Aug. 22, 2017

(54) AIRFLOW GUIDING SYSTEM FOR VEHICLE

(71) Applicant: Hyundai Motor Company, Seoul (KR)

(72) Inventors: Jin Young Yoon, Whasung-Si (KR); Dong Eun Cha, Whasung-Si (KR); Seung Mok Lee, Whasung-Si (KR); Hyun Gyung Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/943,602

(22) Filed: Nov. 17, 2015

(65) Prior Publication Data

US 2017/0015190 A1  Jan. 19, 2017

(30) Foreign Application Priority Data

Jul. 13, 2015  (KR) .......................... 10-2015-0099194

(51) Int. Cl.
| | |
|---|---|
| *B60K 11/04* | (2006.01) |
| *B62D 35/00* | (2006.01) |
| *B60K 11/08* | (2006.01) |

(52) U.S. Cl.
CPC ............ *B60K 11/04* (2013.01); *B60K 11/085* (2013.01); *B62D 35/005* (2013.01)

(58) Field of Classification Search
CPC ....... B60K 11/085; B60K 11/08; B60K 11/04; B60K 13/02
See application file for complete search history.

(56) References Cited

U.S. PATENT DOCUMENTS

| | | | | |
|---|---|---|---|---|
| 2,430,759 A | * | 11/1947 | Crise ................. | B60H 1/00042 180/68.2 |
| 4,273,082 A | * | 6/1981 | Tholen ..................... | F01P 11/08 123/41.31 |
| 4,723,594 A | * | 2/1988 | Koehr .................... | B60K 11/04 123/196 AB |
| 8,561,739 B2 | * | 10/2013 | Hori ..................... | B60K 11/085 180/68.1 |
| 8,631,889 B2 | * | 1/2014 | Begleiter ............. | B60K 11/085 180/68.1 |
| 8,960,343 B2 | * | 2/2015 | Asano .................. | B60K 11/085 180/68.1 |

(Continued)

FOREIGN PATENT DOCUMENTS

| | | |
|---|---|---|
| JP | 2003-306046 A | 10/2003 |
| JP | 2006-306226 A | 11/2006 |

(Continued)

*Primary Examiner* — Hau Phan (74) *Attorney, Agent, or Firm* — Morgan Lewis & Bockius LLP (57) ABSTRACT

An airflow guiding system for a vehicle may include an ambient air intake to receive ambient air in front of a vehicle, engine compartment air holes disposed at a rear side of the ambient air intake and formed to transmit air passing through the ambient air intake to an engine compartment, main ducts disposed at a rear side of the ambient air intake and formed to transmit the air passing through the ambient air intake to each of front wheels, and air flaps operable so as to selectively open or close the engine compartment air holes, in which the air flaps may be configured to close the main ducts when the engine compartment air holes are opened.

6 Claims, 8 Drawing Sheets

(56) References Cited

U.S. PATENT DOCUMENTS

2015/0101550 A1* 4/2015 Nam .................. B60K 11/08
                                                    123/41.33
2015/0343893 A1* 12/2015 Nam .................. B60K 11/085
                                                    701/49

FOREIGN PATENT DOCUMENTS

| JP | 2008-6855 A | 1/2008 |
|----|----|----|
| KR | 10-2008-0005686 A | 1/2008 |

* cited by examiner

AIRFLOW GUIDING SYSTEM FOR VEHICLE

CROSS-REFERENCE TO RELATED APPLICATION

The present application claims priority to Korean Patent Application No. 10-2015-0099194, filed Jul. 13, 2015, the entire contents of which is incorporated herein for all purposes by this reference.

BACKGROUND OF THE INVENTION

Field of the Invention

The present invention relates to an airflow guiding system for a vehicle. More particularly, the present invention relates to an airflow guiding system for a vehicle that is capable of cooling an engine and simultaneously improving aerodynamic performance.

Description of Related Art

In general, an air duct is a path for air, and refers to a pipe for guiding air flow to a part where air needs to be supplied from a port where air can easily flow in. For example, such an air duct includes an air duct that guides air to be sucked into an engine and an air duct for cooling a brake system.

On the other hand, an air flap is a device that selectively opens and closes a passage of air. For example, the air flap can serve to selectively stop the flow of air between a radiator grill and a radiator.

When the air flap disposed between the radiator grill and the radiator opens the passage of air, the air passing through the radiator grill and the air flap exchanges heat with the radiator, and then cools an engine or is supplied as intake air for the engine. Further, when it is not required to cool the radiator and the engine, the air flap disposed between the radiator grill and the radiator closes the passage of air.

When the flow of air entering an engine compartment stops, inner air resistance of the engine compartment may be prevented and aerodynamic performance may be improved, however, use efficiency of air in front of a vehicle body may decrease and interior of the engine compartment may be overheated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an airflow guiding system for a vehicle that is capable of improving use efficiency of air in front of a vehicle body, as well as aerodynamic performance.

According to various aspects of the present invention, an airflow guiding system for a vehicle may include an ambient air intake to receive ambient air in front of a vehicle, engine compartment air holes disposed at a rear side of the ambient air intake and formed to transmit air passing through the ambient air intake to an engine compartment, main ducts disposed at a rear side of the ambient air intake and formed to transmit the air passing through the ambient air intake to each of front wheels, and air flaps operable so as to selectively open or close the engine compartment air holes, in which the air flaps may be configured to close the main ducts when the engine compartment air holes are opened.

The engine compartment air holes and the main ducts may be respectively two in number, and the two main ducts may be respectively disposed to supply air to each of two front wheels.

A rear space of the two engine compartment air holes may be divided by a partition wall.

The air flaps may include a first flap that opens or closes a first of the two engine compartment air holes and a first of the two main ducts and a second flap that opens or close a second of the two engine compartment air holes and a second of the two main ducts, and the first air flap and the second air flap may independently operate.

The airflow guiding system for the vehicle may further include auxiliary ducts continuously opened so that air that does not flow into the ambient air intake but flows along a shape of a vehicle body is transmitted to the front wheels.

The auxiliary ducts may communicate with the main ducts so that the air passing through the main ducts is transmitted to the front wheels together with air passing through the auxiliary duct.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
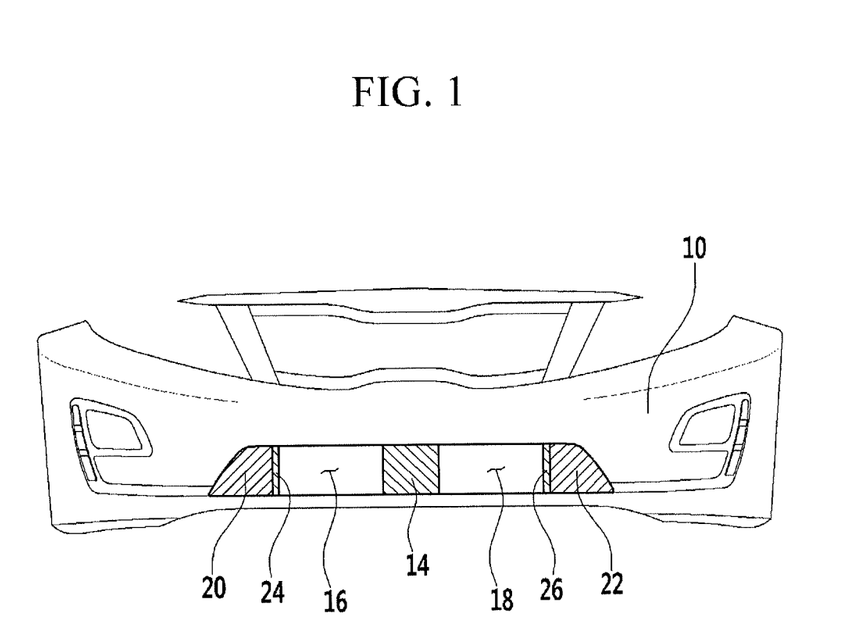
FIG. 1 illustrates a front view of a state in which an air flap of an exemplary airflow guiding system for a vehicle according to the present invention opens air holes of an engine compartment.
Figure 2:
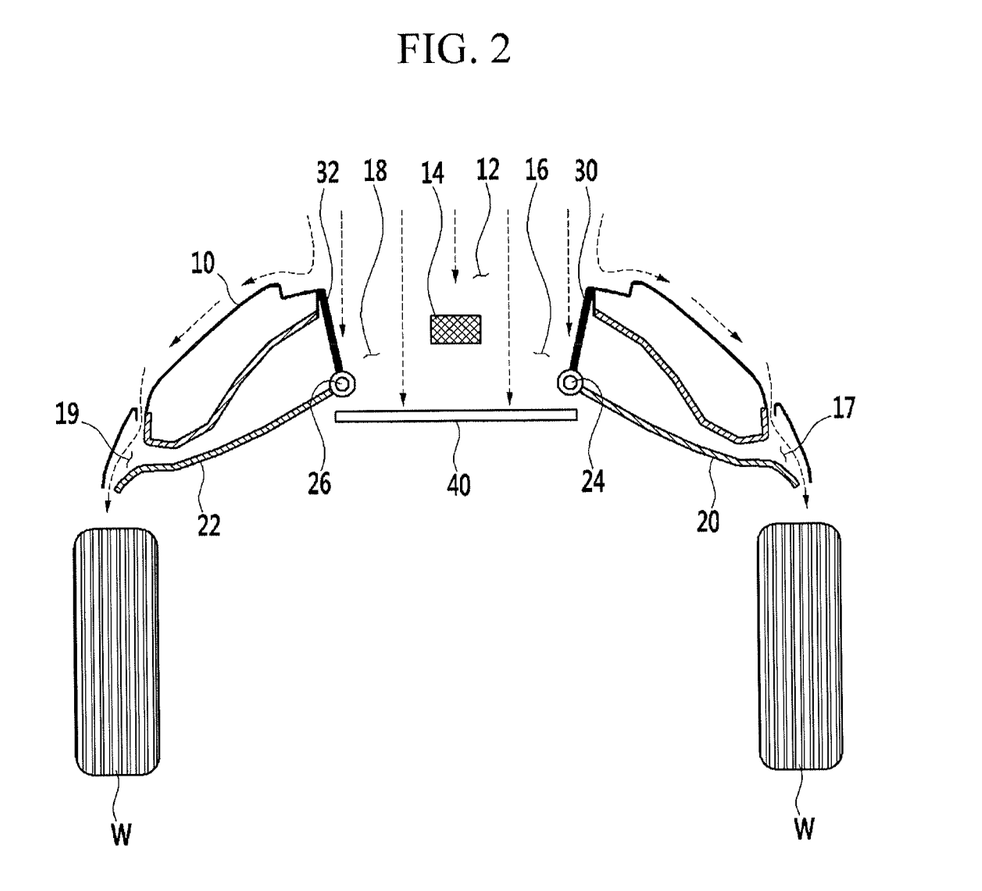
FIG. 2 illustrates a top plan view of a state in which the air flap of the exemplary airflow guiding system for a vehicle according to the present invention opens air holes of an engine compartment.

FIG. 1 illustrates a front view of a state in which an air flap of an airflow guiding system for a vehicle according to various embodiments of the present invention opens air holes of an engine compartment, and FIG. 2 illustrates a top plan view of a state in which an air flap of an airflow guiding system for a vehicle according to various embodiments embodiment of the present invention opens air holes of an engine compartment.

As shown in FIGS. 1 and 2, an airflow guiding system for a vehicle according to various embodiments of the present invention includes an ambient air intake 12, a central partition member 14, a first engine compartment air hole 16, a second engine compartment air hole 18, a first main duct 20, a second main duct 22, a first air flap 30, a second air flap 32, a first hinge 24, and a second hinge 26.

The ambient air intake 12, the central partition member 14, the first engine compartment air hole 16, the second engine compartment air hole 18, the first main duct 20, and the second main duct 22 are formed in a vehicle body 10, and the first air flap 30, the second air flap 32, the first hinge 24, and the second hinge 26 may be provided in the vehicle body 10.

The ambient air intake 12 is an air passage receiving ambient air in front of a vehicle through a radiator grill and the like.

The air passing through the ambient air intake 12 cools a radiator 40, and then flows in an engine compartment. For example, the radiator 40 is disposed between the ambient air intake 12 and the engine compartment. Here, the radiator 40 is a device radiating heat of a high temperature coolant having flowed through the engine to the air, and since it is well known to a person of ordinary skill in the art, a detailed description thereof will be omitted.

The central partition member 14 is disposed in a width direction central portion of the vehicle body 10 in a rear side of the ambient air intake 12. Further, air holes of a rear side of the ambient air intake 12 are partitioned into the first engine compartment air hole 16 and the second engine compartment air hole 18 by the central partition member 14.

The first main duct 20 and the second main duct 22 are respectively disposed at opposite sides of the rear side of the ambient air intake 12.

The first main duct 20 is disposed along a width direction of the vehicle body 10 in the vicinity of the outside of the first engine compartment air hole 16 so as to receive the air passing through the ambient air intake 12. Further, the air passing through the ambient air intake 12 may flow into the first engine compartment air hole 16 or the first main duct 20.

The second main duct 22 is disposed along the width direction of the vehicle body 10 in the vicinity of the outside of the second engine compartment air hole 18 so as to receive the air passing through the ambient air intake 12. Further, the air passing through the ambient air intake 12 may flow into the second engine compartment air hole 18 or the second main duct 22.

The first air flap 30 operates so as to close the first main duct 20 or the first engine compartment air hole 16.

The second air flap 32 operates so as to close the second main duct 22 or the second engine compartment air hole 18.

The first hinge 24 is disposed at a boundary between the first main duct 20 and the first engine compartment air hole 16. Further, the first air flap 30 is rotatably coupled to the first hinge 24, and hinges based on the first hinge 24.

The second hinge 26 is disposed at a boundary between the second main duct 22 and the second engine compartment air hole 18. Further, the second air flap 32 is rotatably coupled to the second hinge 26, and hinges based on the second hinge 26.

FIGS. 1 and 2 illustrate that the first air flap 30 and the second air flap 32 respectively operate to close the first main duct 20 and the second main duct 22. In this case, the first engine compartment air hole 16 and the second engine compartment air hole 18 are opened. Accordingly, the air passing through the ambient air intake 12 flows into the engine compartment through the first engine compartment air hole 16 and the second engine compartment air hole 18. Here, the radiator 40 is disposed in the rear sides of the first engine compartment air hole 16 and the second engine compartment air hole 18, and the air flowing into engine compartment exchanges heat with the radiator 40.

Figure 3:
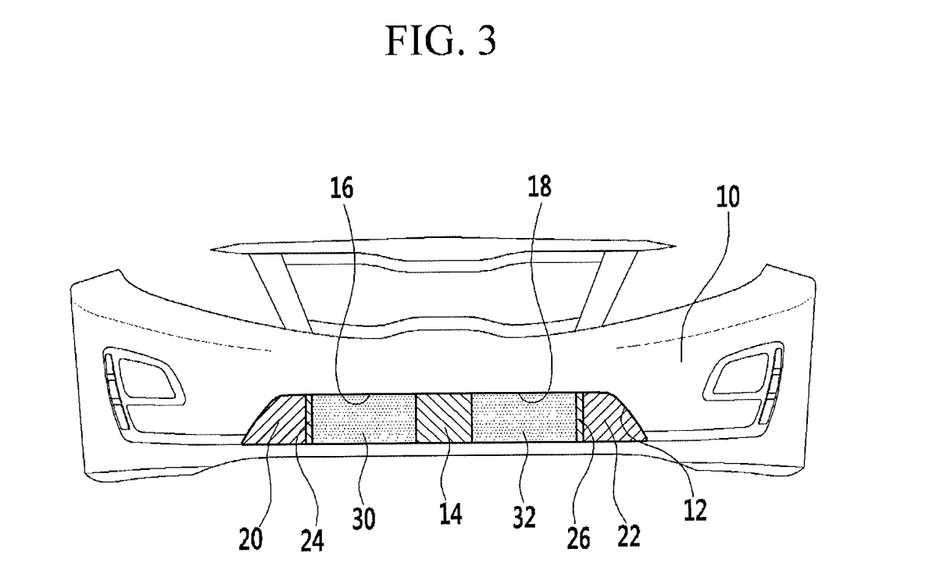
FIG. 3 illustrates a front view of a state in which the air flap of the exemplary airflow guiding system for a vehicle according to the present invention closes air holes of an engine compartment.
Figure 4:
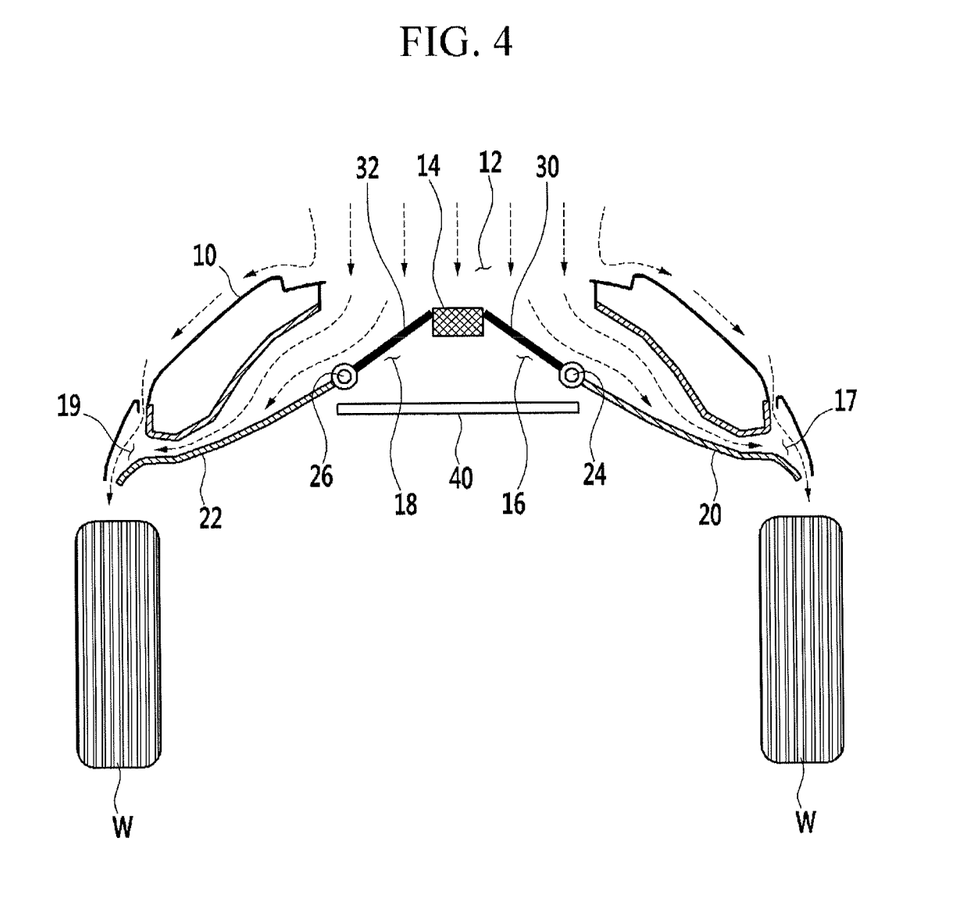
FIG. 4 illustrates a top plan view of a state in which the air flap of the exemplary airflow guiding system for a vehicle according to the present invention closes air holes of an engine compartment.

FIG. 3 illustrates a front view of a state in which an air flap of an airflow guiding system for a vehicle according to various embodiments of the present invention closes air holes of an engine compartment, and FIG. 4 illustrates a top plan view of a state in which an air flap of an airflow guiding system for a vehicle according to various embodiments of the present invention closes air holes of an engine compartment.

As shown in FIGS. 3 and 4, the airflow guiding system for the vehicle according to various embodiments of the present invention includes a first auxiliary duct 17 and a second auxiliary duct 19.

The first auxiliary duct 17 and the second auxiliary duct 19 are respectively disposed at opposite sides of the ambient air intake 12. Further, the first auxiliary duct 17 and the second auxiliary duct 19 are formed so that air flowing along a shape of the vehicle body 10 in the opposite sides of the ambient air intake 12 is transmitted to opposite side front wheels (W). For example, the first auxiliary duct 17 and the second auxiliary duct 19 guide an air flow direction so that air forms an air curtain in front of the wheel (W). Further, the first auxiliary duct 17 and the second auxiliary duct 19 are always opened.

The first auxiliary duct 17 is disposed at the outside of the first main duct 20 along a width direction of the vehicle body 10. Here, the first main duct 20 is formed to have a more outward bent shape toward a rear side of the vehicle, and is extended toward one front wheel (W). Further, the first auxiliary duct 17 communicates with the first main duct 20 extended toward one front wheel (W).

The second auxiliary duct 19 is disposed at the outside of the second main duct 22 along the width direction of the vehicle body 10. Here, the second main duct 22 is formed to have a more outward bent shape toward the rear side of the vehicle, and is extended toward another front wheel (W). Further, the second auxiliary duct 19 communicates with the second main duct 22 extended toward another front wheel (W).

FIGS. 3 and 4 illustrate that the first air flap 30 and the second air flap 32 respectively operate to close the first engine compartment air hole 16 and the second engine compartment air hole 18. In this case, the first main duct 20 and the second main duct 22 are opened. Accordingly, the air that passes through the ambient air intake 12 passes through the first main duct 20 and the second main duct 22.

The air passing through the first main duct 20 is transmitted to form an air curtain in front of the one front wheel (W) together with the air passing through the first auxiliary duct 17. Further, the air passing through the second main duct 22 is transmitted to form an air curtain in front of the other front wheel (W) together with the air passing through the second auxiliary duct 19. Accordingly, when the first main duct 20 and the second main duct 22 are opened, the effect of the air curtain may be improved.

On the other hand, when it is not required that an ambient air flows into the engine compartment for cooling the radiator 40 depending on a state of the engine, and when the first air flap 30 and the second air flap 32 respectively close the first engine compartment air hole 16 and the second engine compartment air hole 18, inner air resistance of the engine compartment is minimized, thereby improving aerodynamic performance.

An airflow guiding system for a vehicle according to various embodiments of the present invention will now be described with reference to FIGS. 5 to 8. In the description below, a duplicated description of the constituent elements that are the same as those of the airflow guiding system for the vehicle according to the various embodiments of the present invention described with reference to FIGS. 1 to 4 will be omitted.

Figure 5:
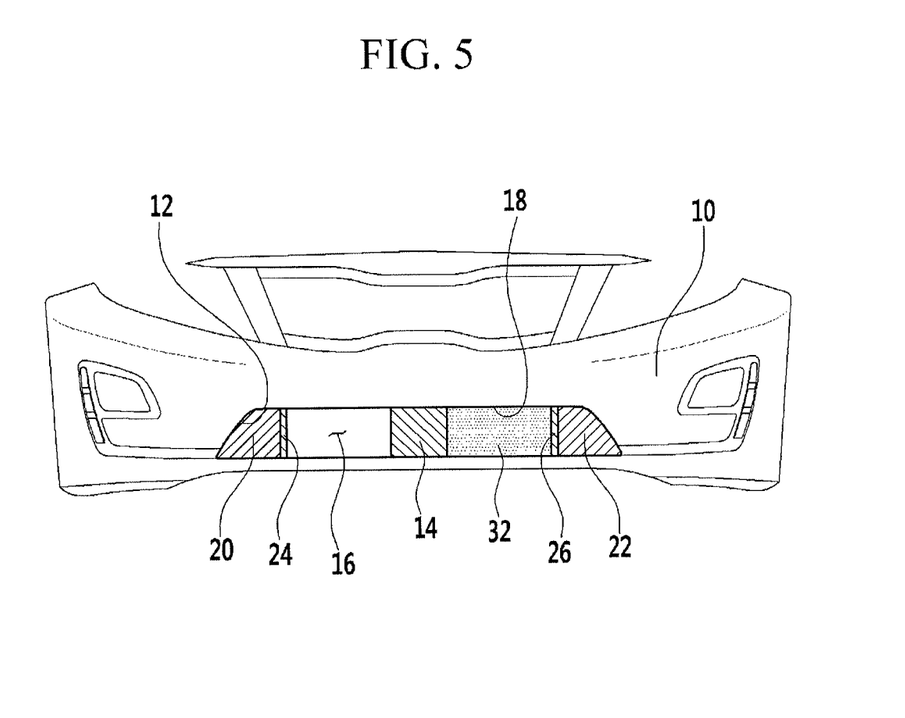
FIG. 5 illustrates a front view of a state in which an air flap of an exemplary airflow guiding system for a vehicle according to the present invention closes one air hole of an engine compartment.
Figure 6:
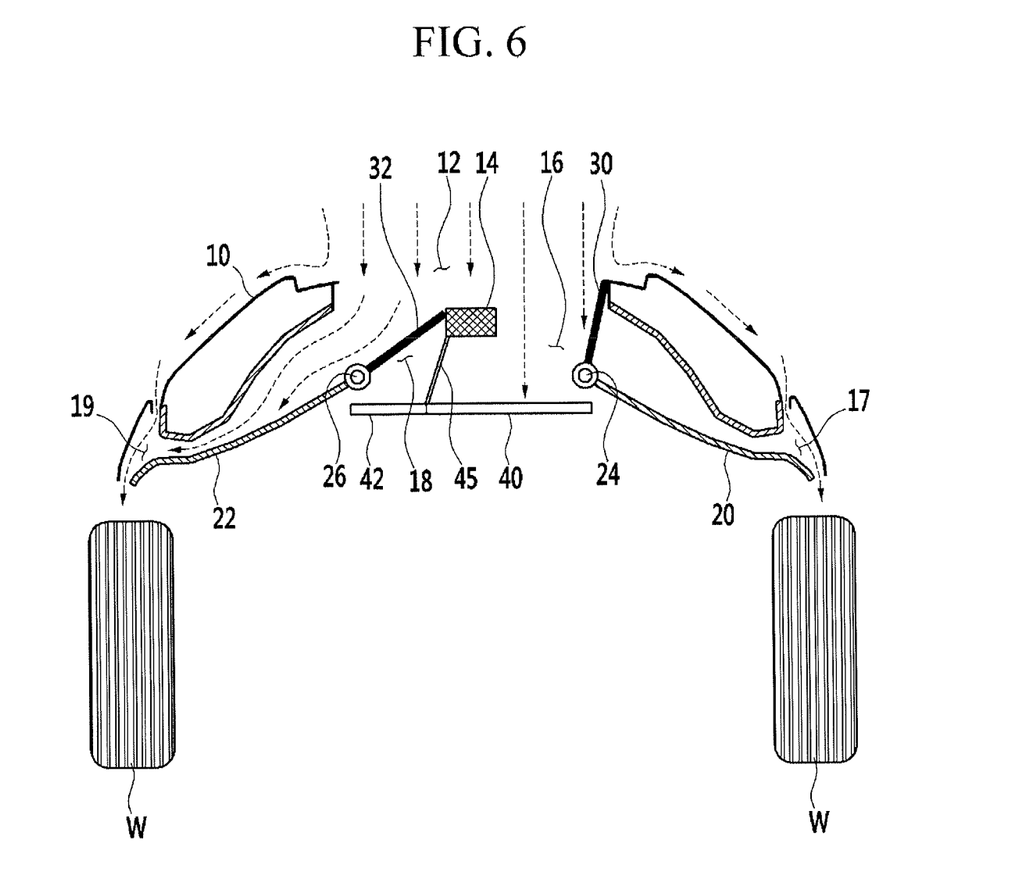
FIG. 6 illustrates a top plan view of a state in which the air flap of the exemplary airflow guiding system for a vehicle of FIG. 5, according to the present invention, closes one air hole of an engine compartment.

FIG. 5 illustrates a front view of a state in which an air flap of an airflow guiding system for a vehicle according to various embodiments of the present invention closes one air hole of an engine compartment, and FIG. 6 illustrates a top plan view of a state in which an air flap of an airflow guiding system for a vehicle according to various embodiments of the present invention closes one air hole of an engine compartment.

As shown in FIGS. 5 and 6, an airflow guiding system for a vehicle according to various embodiments of the present invention further includes a partition wall 45, and the first air flap 30 and the second air flap 32 may be independently operated.

When the radiator 40 and an intercooler 42 are disposed to be adjacent to each other, one end of the partition wall 45 is connected to the central partition member 14, and the other end thereof is connected to a boundary between the radiator 40 and the intercooler 42. For example, a space in which the radiator 40 is disposed and a space in which the intercooler 42 is disposed are divided by the partition wall 45. Here, the intercooler 42 is a device of cooling intake air of the engine, and since it is well known to a person of ordinary skill in the art, a detailed description thereof will be omitted.

FIGS. 5 and 6 illustrate that the first air flap 30 operates so as to close the first main duct 20, and the second air flap 32 operates so as to close the second engine compartment air hole 18. In this case, the first engine compartment air hole 16 and the second main duct 22 are opened. Accordingly, some of the air passing through the ambient air intake 12 flows into the engine compartment through the first engine compartment air hole 16, and the other portion thereof passes through the second main duct 22.

The air that passes through the first engine compartment air hole 16 and then flows into the engine compartment exchanges heat with the radiator 40 disposed at a rear side of the first engine compartment air hole 16. Further, the air passing through the second main duct 22 is transmitted to form an air curtain in front of the front wheel (W) together with the air passing through the second auxiliary duct 19.

On the other hand, when it is not required to cool the intercooler 42 depending on a state of the engine, and when the second air flap 32 closes the second engine compartment air hole 18, an amount of ambient air flowing to the inside of the engine compartment is reduced and thus inner air resistance of the engine compartment decreases, thereby improving aerodynamic performance.

Figure 7:
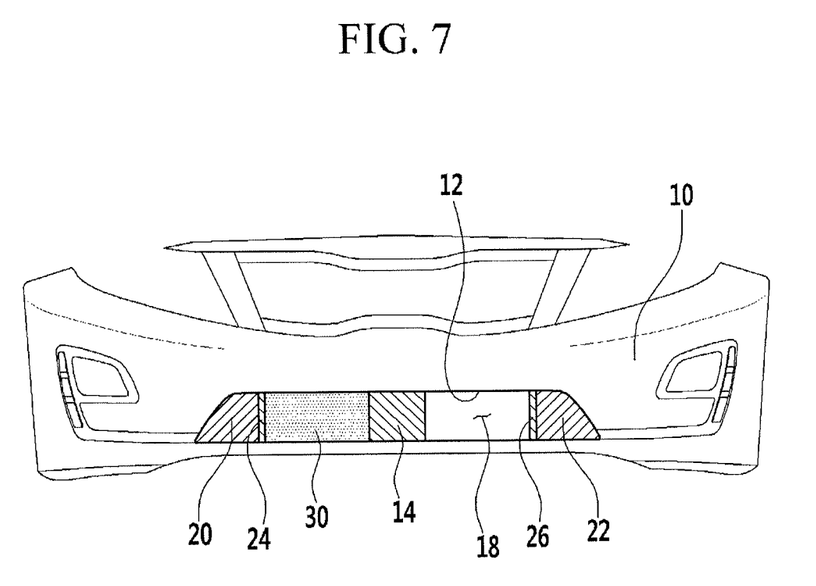
FIG. 7 illustrates a front view of a state in which the air flap of the exemplary airflow guiding system for a vehicle of FIG. 5, according to the present invention, closes another air hole of an engine compartment.
Figure 8:
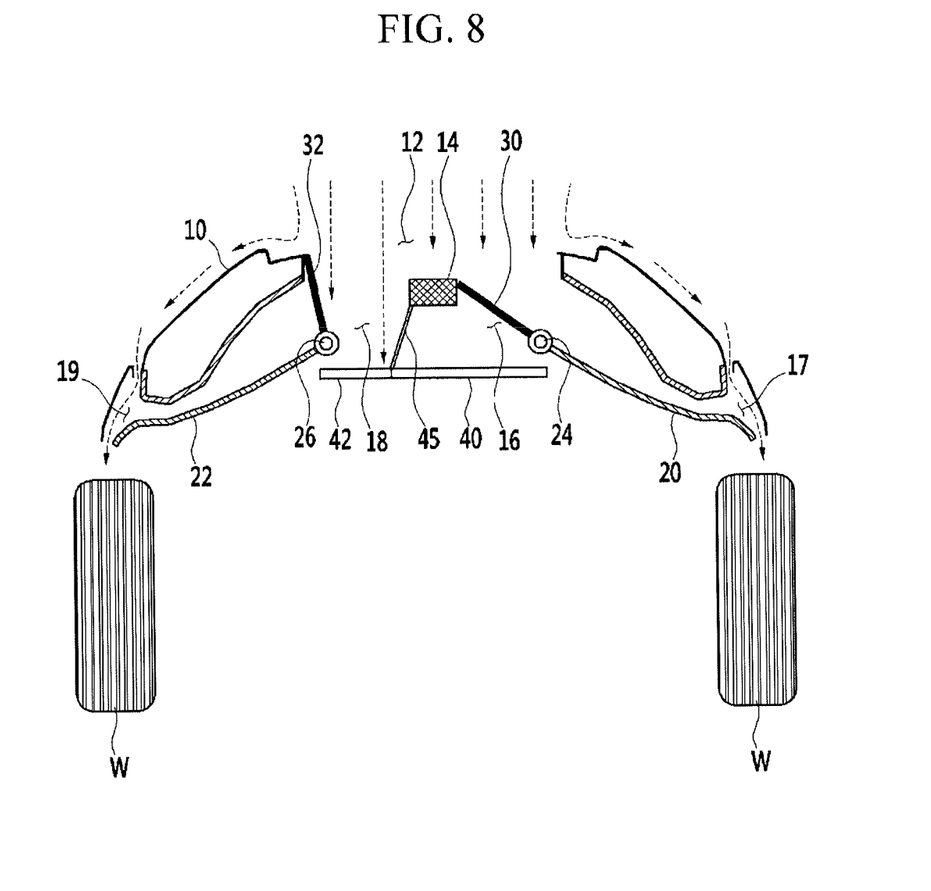
FIG. 8 illustrates a top plan view of a state in which the air flap of the exemplary airflow guiding system for a vehicle of FIG. 5, according to the present invention, closes another air hole of an engine compartment.

FIG. 7 illustrates a front view of a state in which an air flap of an airflow guiding system for a vehicle according to various embodiments of FIG. 5 closes another air hole of an engine compartment, and FIG. 8 illustrates a top plan view of a state in which an air flap of an airflow guiding system for a vehicle according to various embodiments of FIG. 5 closes another air hole of an engine compartment.

FIGS. 7 and 8 illustrate that the first air flap 30 operates so as to close the first engine compartment air hole 16, and the second air flap 32 operates so as to close the second main duct 22. In this case, the first main duct 20 and the second engine compartment air hole 18 are opened. Accordingly, some of the air passing through the ambient air intake 12 passes through the first main duct 20, and the other portion thereof passes through the second engine compartment air hole 18 and then flows into the engine compartment.

The air passing through the first main duct 20 is transmitted to form an air curtain in front of the front wheel (W) together with the air passing through the first auxiliary duct 17. Further, the air that passes through the second engine compartment air hole 18 and then flows into the engine compartment exchanges heat with the intercooler 42 disposed at a rear side of the second engine compartment air hole 18.

On the other hand, when it is not required to cool the radiator 40 depending on a state of the engine, and when the first air flap 30 closes the first engine compartment air hole 16, an amount of ambient air flowing to the inside of the engine compartment is reduced and thus inner air resistance of the engine compartment decreases, thereby improving aerodynamic performance.

In other words, the air passing through the ambient air intake 12, if necessary, may be supplied to cool the radiator 40 or the intercooler 42, or may be transmitted to form the air curtain in front of the wheel (W). Accordingly, the air passing through the ambient air intake 12 may be efficiently used for cooling the radiator 40 or the intercooler 42, and even when it is not required to cool the radiator 40 and the intercooler 42, it does not act as running resistance of the vehicle and may be used to form the air curtain in front of the wheel (W).

As described above, according to the various embodiments of the present invention, it is possible to improve fuel efficiency by blocking air supplied to the engine compartment and minimizing air resistance if necessary. In addition, according to the various embodiments of the present invention, it is possible to improve aerodynamic performance while selectively supplying ambient air in front of the vehicle body 10 to the engine compartment.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An airflow guiding system for a vehicle, comprising:
   an ambient air intake to receive ambient air in front of the vehicle;
   engine compartment air holes disposed at a rear side of the ambient air intake and formed to transmit air passing through the ambient air intake to an engine compartment;
   main ducts disposed at a rear side of the ambient air intake and formed to transmit the air passing through the ambient air intake to each of front wheels; and
   air flaps operable so as to selectively open or close the engine compartment air holes,
   wherein the air flaps are configured to close the main ducts when the engine compartment air holes are opened.

2. The airflow guiding system for the vehicle of claim 1, wherein the engine compartment air holes and the main ducts are respectively two in number, and the two main ducts are respectively disposed to supply air to each of two front wheels.

3. The airflow guiding system for the vehicle of claim 2, wherein a rear space of the two engine compartment air holes is divided by a partition wall.

4. The airflow guiding system for the vehicle of claim 2, wherein the air flaps include a first flap that opens or closes a first of the two engine compartment air holes and a first of the two main ducts and a second flap that opens or close a second of the two engine compartment air holes and a second of the two main ducts, and the first air flap and the second air flap independently operate.

5. The airflow guiding system for the vehicle of claim 1, further comprising auxiliary ducts continuously opened so that air that does not flow into the ambient air intake but flows along a shape of a vehicle body is transmitted to the front wheels.

6. The airflow guiding system for the vehicle of claim 5, wherein the auxiliary ducts communicate with the main ducts so that the air passing through the main ducts is transmitted to the front wheels together with air passing through the auxiliary duct.

* * * * *